United States Patent [19]

Di Matteo et al.

[11] 3,866,052

[45] Feb. 11, 1975

[54] METHODS FOR GENERATING SIGNALS DEFINING THREE-DIMENSIONAL OBJECT SURFACES

[75] Inventors: Paul L. Di Matteo, Dix Hills; Joseph A. Ross, Fort Salonga; Howard K. Stern, Greenlawn, all of N.Y.

[73] Assignee: Dynell Electronics Corporation, Melville, N.Y.

[22] Filed: Nov. 2, 1973

[21] Appl. No.: 412,162

[52] U.S. Cl. .................................... 250/558, 356/2

[51] Int. Cl. ............................................ H01j 39/12

[58] Field of Search .......... 250/558, 555, 202, 203; 356/2

[56] References Cited

UNITED STATES PATENTS

| | | | |
|---|---|---|---|
| 3,566,139 | 2/1971 | Hardy | 250/558 |
| 3,597,083 | 8/1971 | Fraser | 356/2 |
| 3,749,493 | 7/1973 | Macovski | 356/2 |
| 3,777,055 | 12/1973 | Hobrough | 250/558 |

*Primary Examiner*—James W. Lawrence
*Assistant Examiner*—D. C. Nelms
*Attorney, Agent, or Firm*—Watson Leavenworth Kelton & Taggart

[57] ABSTRACT

Signals having indications useful in defining the location of an object surface point in space are generated from a two-dimensional record encoded in accordance with an object surface irradiating succession to provide information additional to record-contained $x$, $y$ positional coordinate data for the surface point.

In a preferred practice, adjacent portions of an object are successively irradiated and a corresponding series of photographic records is made. For each object surface point of interest in the records, a signal is generated having $x$, $y$ positional coordinate data for such point and having further content indicating the order in the record succession of those records including such point.

15 Claims, 7 Drawing Figures

METHODS FOR GENERATING SIGNALS DEFINING THREE-DIMENSIONAL OBJECT SURFACES

FIELD OF THE INVENTION

This invention relates generally to the reproduction of objects in three dimensions and more particularly to methods involving the use of photographic or like two-dimensional records in the generation of three-dimensional information defining object surfaces.

BACKGROUND OF THE INVENTION

Presently-known methods for three-dimensional object reproduction generally provide for the selective exposure of plane-like segments of the object for generating a series of photographs of segments of the object surface. These photographs are then processed to determine object surface boundaries and corresponding three-dimensional slices of the object are made and assembled by stacking to reproduce the object.

While the object segment approach in these known methods is beneficial in providing increased resolution in defining surface boundaries emphasized through high-intensity limited-area exposure, such methods necessarily confront a transition from two-dimensional photographic data to three-dimensional space in the processing of photographs. The extensive empirical effort involved in making such transition greatly detracts from the commercial value of the methods and virtually eliminates computer assistance.

SUMMARY OF THE INVENTION

It is an object of the present invention to provide improved methods of the foregoing type wherein the transition from two-dimensional photographs to three-dimensional information is simplified.

It is a more particular object of the invention to provide for the generation, directly from a two-dimensional record, of signals for use in defining three-dimensional coordinates of points in such record.

In attaining the foregoing and other objects, the invention provides a method wherein a projection field inclusive of an object surface point is defined and wherein radiant energy is projected into segments of such projection field for irradiating portions of the surface of an object in a discernible succession. Records of the irradiated object portions are made in a discernible succession corresponding to the irradiating succession. A signal is generated which is selectively indicative of the order, in the record succession, of those records which include a particular surface point. The record succession may be embodied in multiple record frames where the radiant energy applied to the object surface is of a common frequency and may be embodied in a single record frame where different frequency radiant energy is applied to the object portions. This generated signal may be used along with two-dimensional coordinate data signals also derived from the records to reconstruct object surface points in space.

The foregoing and other objects and features of the invention will be understood by reference to the following detailed description of preferred practices in accordance with the invention and from the drawings wherein like reference numerals are used for like parts throughout.

DESCRIPTION OF PREFERRED EMBODIMENTS AND PRACTICES

Figure 1:
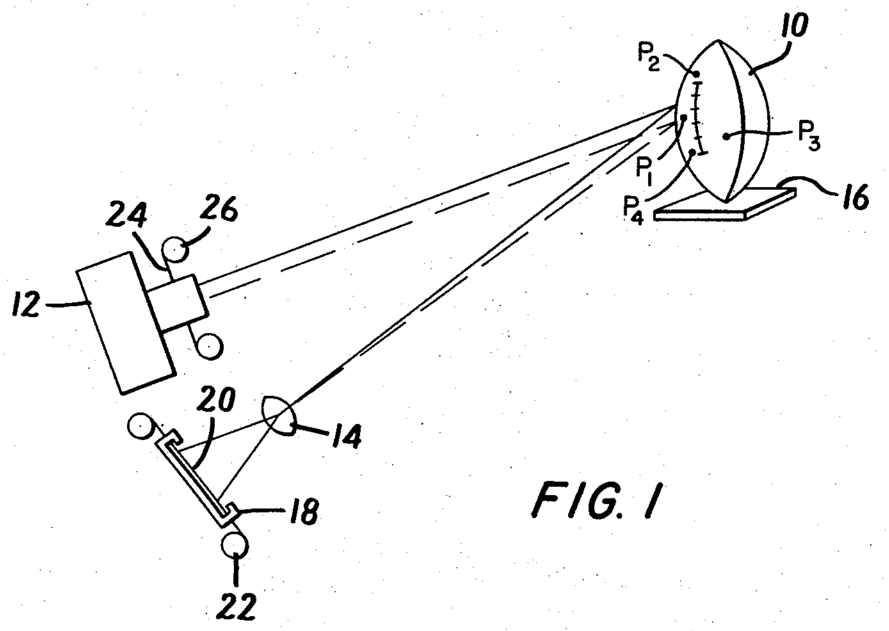
FIG. 1 illustrates an object to the reproduced in association with a radiant energy projector and recorder.

In FIG. 1 an object 10, a surface of which is to be reproduced in its three-dimensions, is disposed in the field of projection of radiant energy projector 12 and further in the field of view of objective lens 14. The object is supported, for example, by pedestal 16, and projector 12 and lens 14 are secured in fixed relation to the pedestal. Member 18 supports single frames of recording medium 20 in the focal plane of lens 14. Record medium transport spools 22 are associated with member 18 for collecting recording medium frames on exposure and for advancing unexposed recording medium frames into member 18.

Figure 2:
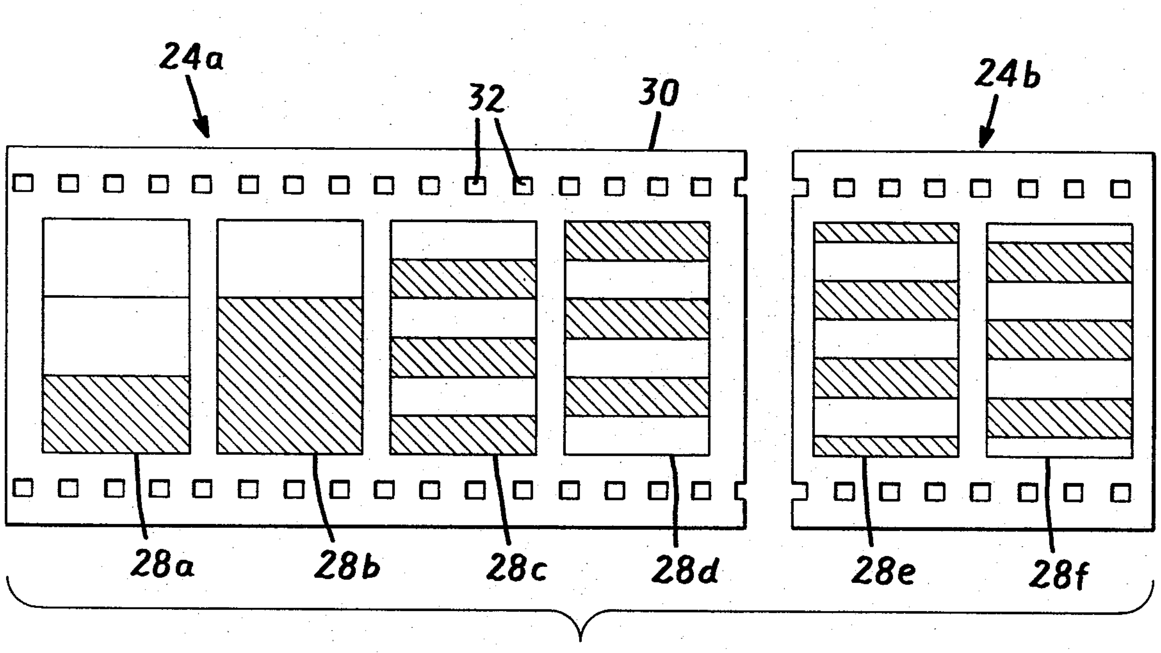
FIG. 2 illustrates a masking element useful in conjunction with the projector of FIG. 1 for practicing the invention.

Masking element 24 is translatable in the projection field of view of projector 12 by masking element transport spools 26 for limiting the projection field of projector 12 to provide for selective irradiation of object surface parts as seen more particularly by reference to FIG. 2, which illustrates a masking element 24*a* suitable for this purpose.

Masking element 24*a* includes a plurality of masks 28*a–d* each having expanses transmissive to projection radiant energy and further expanses, shown by cross-hatching, which are non-transmissive thereto. The masks are desirably supported on a web-like substrate 30 which is transmissive to projection radiant energy solely in the areas thereof on which masks 28*a–d* are disposed. Transport of the masking element, and hence mask-changing, is facilitated by such means as apertures 32 which may be engaged by complementary pins on spools 26. Where a projection field inclusive of the entire facing surface of the object is comprised of respectively contiguous upper, middle and lower portions, mask 28*a* limits the same such that the operative projection field embraces the upper and middle portions. Mask 28*b* limits the operative projection field to the upper portion. Mask 28*c* limits the operative projection field to the upper-half segment of all portions. Mask 28*d* limits the operative projection field to the lower-half segments of all portions.

Figure 3:
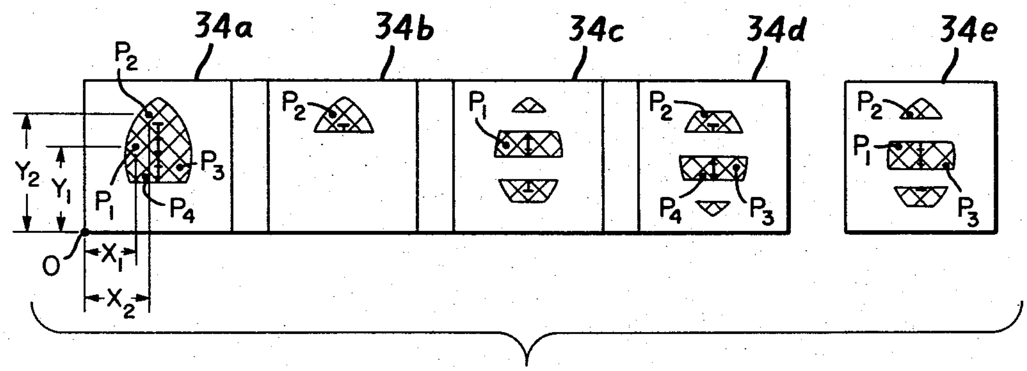
FIG. 3 depicts a succession of photographic records resulting from use of the FIG. 2 masking element.

Exemplary practice in accordance with the invention will be understood by considering the activity associated with the generation of signals for use in defining the spatial positions of points $P_1$ and $P_2$ on the facing surface of object 10 and by reference to FIG. 3 which illustrates a succession of developed film frames 34*a–d* derived by use of the particularly illustrated masking element 24*a* of FIG. 2. In such use, element 24*a* is transported incrementally whereby its masks are successively and individually employed. Each developed film frame preferably comprises a positive version of the negative representation of the object surface derived in exposing the frame to radiant energy projected through a selective one of masks 28*a–d* and reflected by the object surface.

In developed film frame 34*a*, provided through use of masks 28*a*, the upper and middle portions of the object surface all displayed, points $P_1$ and $P_2$ respectively having positional coordinates $x_1$, $y_1$ and $x_2$, $y_2$ relative to the frame origin *O*. The developed frames taken individually, display only such two-dimensional positional coordinates and, since the positional relationships are constant among the object, the projector, the objective lens and each film frame, point $P_1$ (and $P_2$) has the same *x* and *y* coordinates in each of the developed film frames in which it is present. In frame 34*b* that part of the object surface within the operative projection field defined by mask 28*b* is illustrated and includes point $P_2$ but not point $P_1$. Frame 34*c* depicts that portion of the object surface within the operative projection field defined by mask 28*c* and includes point $P_1$ but not point $P_2$. Frame 34*d* embodies object surface portions irradiated by energy projected through mask 28*d*, including point $P_2$ but not point $P_1$.

In practice discussed to this juncture, a projection field is initially defined which includes the two object surface points under consideration and extends from a first location, i.e., projector 12. The object surface in such field may or may not be irradiated as desired, based on the extent of the object surface intended to be reproduced. Following such projection field definition, radiant energy is projected into predetermined portions of that field for successively irradiating parts of the object surface. At least one of these segments excludes one of the two surface points of interest and each point is included in at least one of the segments. Records are made of the irradiated object surface in a succession corresponding with the object surface irradiating succession.

In further practice of the methods under discussion, records in such succession are each examined to determine particular information concerning the surface points of interest. This step is preferably practiced simultaneously as respects all records by apparatus such as that illustrated in FIG. 4.

Figure 4:
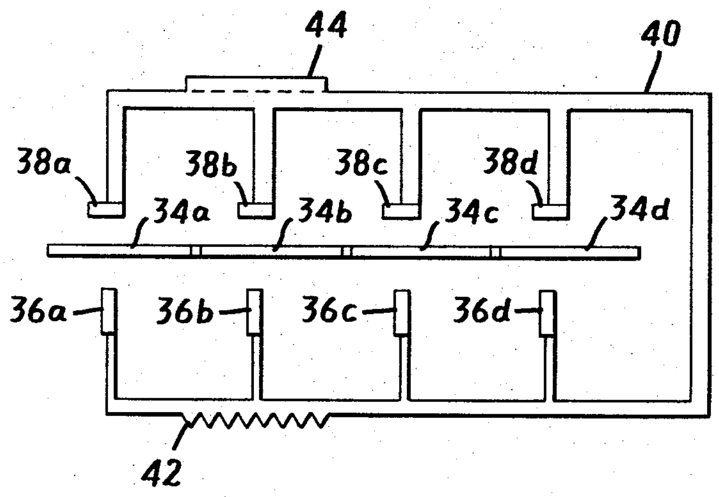
FIG. 4 shows an embodiment of a scanning mechanism for examining the records of FIG. 3.

In FIG. 4 each of pencil-beam radiant energy sources 36*a–d* is arranged in fixed alignment with one of radiant energy sensors 38*a–d* in a scanning mechanism 40 to provide source-sensor pairs. Developed film frames 34*a–d* are positioned collectively intermediate sources 36*a–d* and sensors 38*a–d* such that all source-sensor pairs are aligned at one time with the origin *O* or other common reference point of the associated film frame. Following such alignment, the film frames are fixedly positioned and the scanning mechanism is moved relative thereto. To this end, the scanning mechanism may include an *x* translational rack 42 and a *y* translational rack 44, each associated with a motor-driven pinion, or the like, operative to position the source-sensor pairs collectively on common film frame points other than that employed in alignment. *x* and *y* positional coordinate data signals may be generated, by conventional motor-responsive digitizing devices, for each film frame point on which the source-sensor pairs are positioned.

Such *x* and *y* positional coordinate data signals are indicative of two-dimensional information respecting the position of a point under study in each of film frames 34*a–d*. In order to determine the spatial position of such point in three dimensions, further information is required, i.e., the relationship existing between the object, the projector and the unexposed film frame during exposure of the frames. In accordance with the invention, such further information is preferably provided in digital format as follows.

Where all FIG. 4 source-sensor pairs are in alignment with point $P_1$ of the FIG. 3 developed film frames, energization of sources 36*a–d* will result in energization only of sensors 38*a* and 38*c* and only these sensors will generate output signals in excess of a predetermined threshold amplitude. Bi-level switching circuit means may be operatively responsive to sensor output signals in excess of such threshold amplitude to provide a ONE (1) signal, e.g., a positive d.c. voltage. Where a sensor output signal is of amplitude less than such threshold amplitude, the switching circuit means provides a ZERO (0) signal, e.g., ground potential or a negative d.c. voltage. Prior to each energization of sources 36*a–d*, all of the bi-level circuit means are reset so as to provide ZERO signals.

In the case of point $P_1$, if the output signals of all bi-level circuit means are collected serially in digital format on energization of sources 36*a–d*, a signal indicating the digital pulse pattern 1010 is generated. This signal thus provides selective indication of the order in the record succession of those records which include point $P_1$. Accordingly, if the source-sensor pairs are aligned with surface point $P_2$ as depicted in film frames 34*a–d*, the resulting digital pulse pattern will be 1101.

Based on the selection of points $P_1$ and $P_2$ in the example at hand, it will be apparent that a useful composite signal, i.e., a signal providing coordinate positional and other distinction between the two points facilitating determination of spatial positioning thereof, is in fact available through use only of masks 28*a* and 28*b*, film frames 34*a* and 34*b*, sources 36*a* and 36*b* and sensors 38*a* and 38*b* and associated circuit means generating the 1 or 0 signals. Thus, the digital pulse patterns 10 and 11 derived through these means would, together with indication of $x_1$, $y_1$ and $x_2$, $y_2$ respectively and discriminatingly provide a basic measure of spatial positioning of points $P_1$ and $P_2$. On the other hand, in order to provide basic discrimination among points $P_1$, $P_2$ and $P_3$ (FIGS. 1 and 3), masks 28*a*, 28*b* and 28*c*, film frames 34*a*, 34*b* and 34*c*, sources 36*a*, 36*b* and 36*c* and sensors 38*a*, 38*b* and 38*c* need be employed. In a still further instance, e.g., for points such as $P_3$ and $P_4$ (FIGS. 1 and 3), it will be seen that mask arrangement 24*a* does not provide discrimination beyond positional coordinate distinction. Thus, the same pulse pattern 1001 applies in the cases of $P_3$ and $P_4$. In such instance, mask 28*e* of mask arrangement 24*b* of FIG. 2 is used with mask arrangement 24*a*.

Referring to FIG. 2, mask 28*e* will be seen to be comprised of an uppermost cross-hatched section of one-half the vertical width of the adjacent transparent section. Succeeding sections of the mask are of equal vertical width and alternately transparent with the lowermost cross-hatched section being of the same width as the uppermost cross-hatched section. So configured, this mask provides for different permutation, as shown in film frame 34*e* (FIG. 3), of photographed object surface parts.

By the use of mask 28*e*, resolution is increased by a factor of two. In the example at hand, use of this mask, and expansion of the FIG. 4 apparatus to include an additional source-sensor pair to examine film frame 34*e*, provides discrimination as between points $P_3$ and $P_4$, respectively present and absent from film frame 34*e*. Pulse patterns which may be respectively generated for points $P_3$ and $P_4$ are 10011 and 10010. Accuracy in determining the spatial positioning of object surface points is evidently improved in proportion to the number of segments into which the projection field of view is subdivided. The resulting digital pulse patterns may be conveniently transformed into binary-coded decimal pulse patterns for ease in computation of the spatial positions of surface points.

While discussion of the methods of the invention has considered the matter of providing for discrimination, apart from that residing in unique positional coordinate data, concerning plural object surface points, the invention, of course, contemplates the generation of a composite information signal for use in defining the spatial position of a single object surface point, e.g., a signal indicative of $x$, $y$ and an identifier, such as 10101 (from film frames 34*a*—34*e*) or any more or less extensive digital pulse pattern, useful in computing the spatial position of $P_1$.

Figure 5:
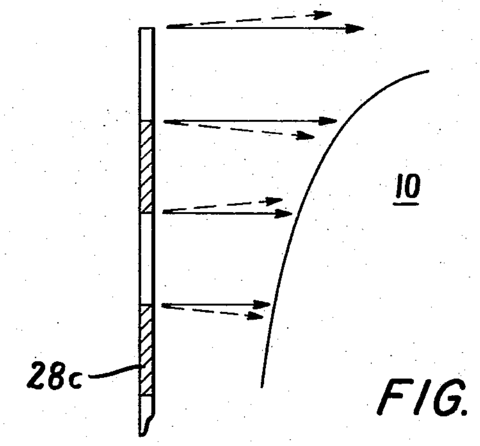
FIG. 5 illustrates an individual mask of the FIG. 2 masking element in section and an object surface.

In FIG. 5, mask 28*c* is illustrated in section and in projection field-defining relation to the object surface. The space between adjacent solid arrows and between the object surface and transmissive parts of the mask is the projection field desired on use of mask 28*c*. Due to such factors as light dispersion, the actual projection field provided by the use of mask 28*c* is expanded somewhat as indicated by the broken arrow lines. In certain instances, where object surface definition is particularly critical, such expanded projection field may give rise to undesired results. In this connection mask 28*c* is a complement to mask 28*d* (FIG. 2). An object surface point at the bottom of the uppermost projection field of mask 28*c* may also reside at the top of the uppermost expanded projection field of mask 28*d*. In further practice according with the invention eliminating this possible confusion, masks 28*c*–28*e* are used in conjunction with a further mask, 28*f*, shown on masking arrangement 24*b* of FIG. 2. This mask will be seen to be a total complement to mask 28*e*, i.e., having cross-hatched expanses coextensive with the non-cross-hatched expanses of mask 28*e*.

Figure 6:
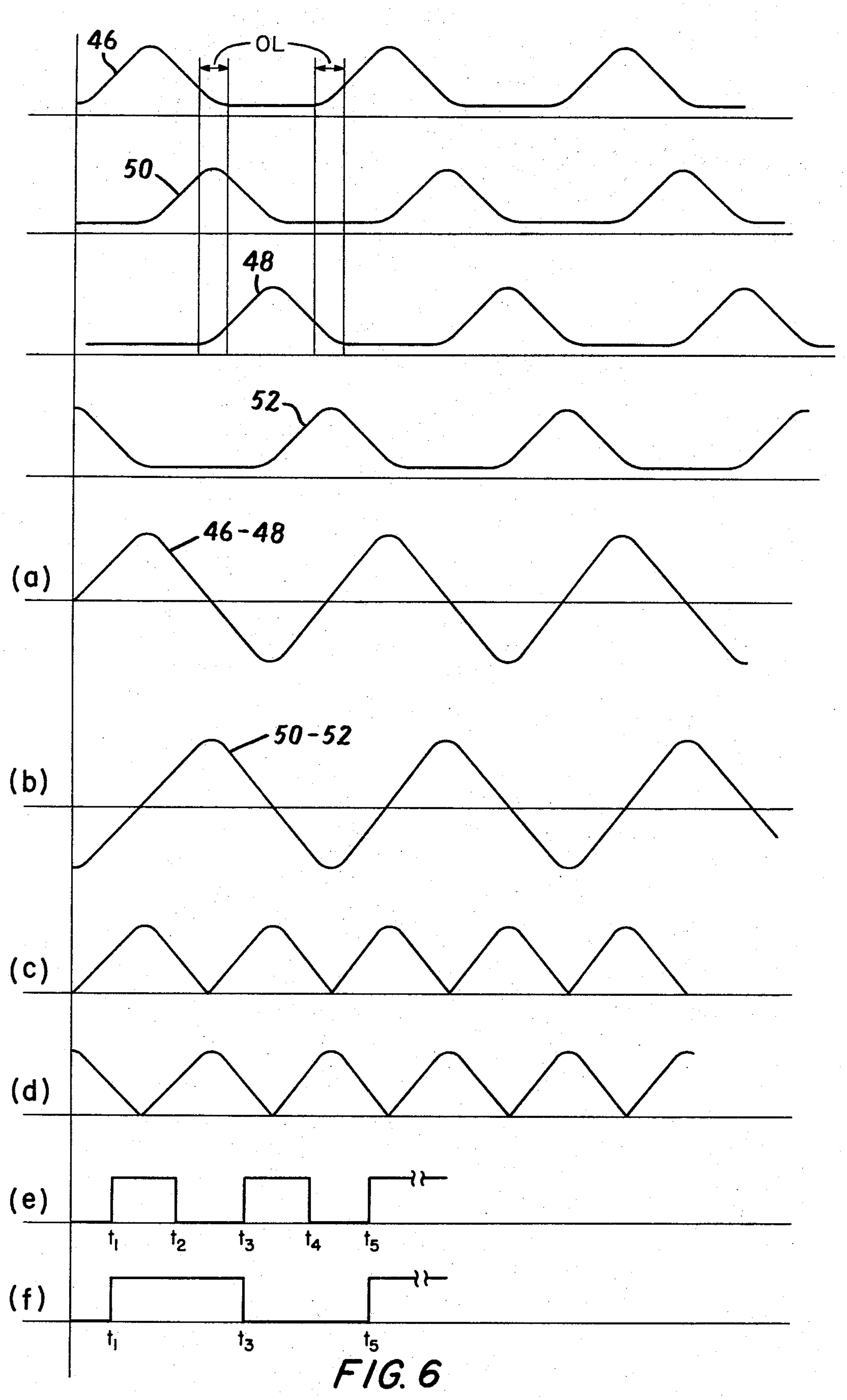
FIG. 6 illustrates signals generated in a preferred practice of the invention.

On taking of photographs of the object surface successively through masks 28*c*–28*f*, the apparatus of FIG. 4 is used to examine the photographs. The apparatus is aligned as discussed above, is set to a given $x$ location and is then translated in $y$ at that $x$ location. Output signals of sensors 38*a*, 38*b*, 38*c* and 38*d* are illustrated schematically in FIG. 6 respectively by the reference numerals 46, 48, 50 and 52, each signal illustrating the amplitude versus time (distance) characteristics of the output of the corresponding sensor. Considering signals 46 and 48, it will be seen that these signals exhibit overlap (OL) according with the light dispersion geometry, e.g., as shown in FIG. 5. The signals also include a d.c. level attributable to background. The signals are preferably processed by procedures shown in FIG. 6, which may be implemented by apparatus illustrated in FIG. 7.

Figure 7:
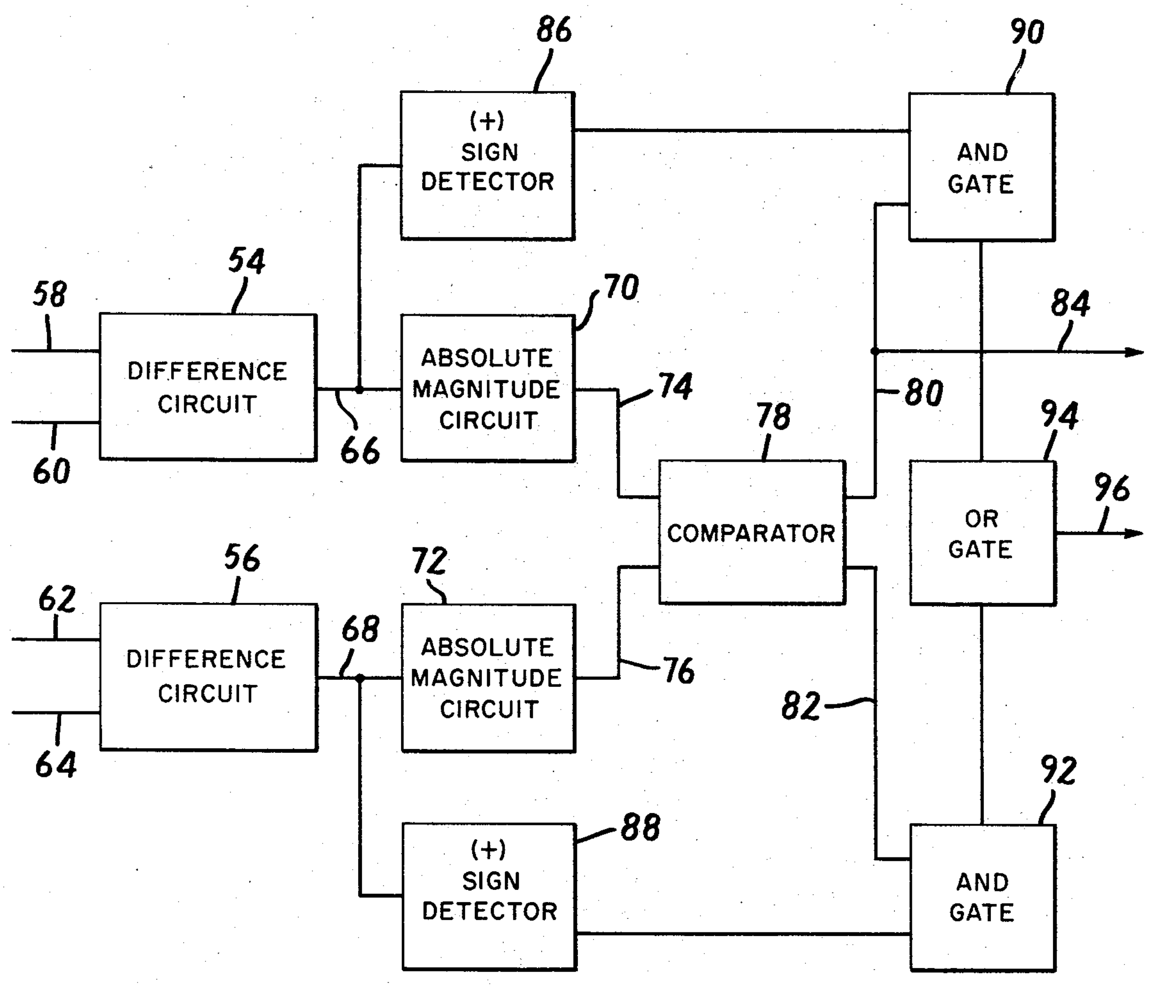
FIG. 7 shows apparatus for generation of some of the FIG. 6 signals.

Referring to FIG. 7, difference circuits 54 and 56 receive selective sensor output signals for amplitude for subtracting purposes. Circuit 54 differences signals 46 and 48 of FIG. 6, respectively applied thereto on input lines 58 and 60 and deriving from photographs provided by use of masks 28*c* and 28*d*. Circuit 56 differences signals 50 and 52 of FIG. 6, respectively applied thereto on lines 62 and 64 and deriving from photographs provided by use of masks 28*e* and 28*f*. The output signals provided by circuits 54 and 56 are without d.c. level and are applied to lines 66 and 68 and are visually indicated in FIG. 6 at parts (*a*) and (*b*) thereof. These signals are made unipolar by absolute magnitude circuits 70 and 72 which provide their output signals on lines 74 and 76, as shown at (c) and (d) of FIG. 6. Lines 74 and 76 are connected to the input terminals of comparator circuit 78 which provides output indication on line 80 where the line 74 signal is of greater amplitude than the line 76 signal and provides output indication on line 82 when the line 76 signal is of greater amplitude than the line 74 signal. Line 80 is connected to line 84 to provide a first output signal from the FIG. 7 apparatus. This signal is illustrated at (e) of FIG. 6 and comprises a pulse train, the pulses of which are alternately indicative of the extents of signals 46 and 48 which have information content corresponding to the projection fields desired through use of masks 28*c* and 28*d*. Thus, if signal 46 is examined for its content exclusively during the $t_1$–$t_2$ extent thereof, information may be derived concerning the object surface corresponding to the uppermost projection field defined by mask 28*c*. Likewise, if signal 48 is examined during the $t_3$–$t_4$ extent thereof, information concerning object surface according with the uppermost projection field defined by mask 28*d* may be derived. The spaces between the pulses are likewise alternately indicative of useful information content of signals 50 and 52. Signal (e) accordingly provides a convenient clock for examination of sensor output signals.

A second output signal is generated by the FIG. 7 apparatus for use with the clock signal (e) and is provided by the circuitry comprising sign detectors 86 and 88, AND gates 90 and 92 and OR gate 94. OR gate 94 yeilds such second output signal on line 96, this signal being illustrated at (f) in FIG. 6. In operation of the last-discussed circuitry, line 80 is HI (ONE) in the first of the above-mentioned conditions, i.e., where the line 74 signal exceeds the line 76 signal. If under these conditions, the line 58 signal is more positive than the line 60 signal, sign detector 86 provides a HI and gate 90 is enabled whereupon gate 94 provides an output HI. Referring to signal (f), these conditions prevail during the period $t_1$–$t_2$. At $t_2$, the line 76 signal exceeds the line 74 signal providing a HI on line 82. Concurrently, since the line 62 signal is now more positive than the line 64 signal, sign detector 88 likewise provides a HI and gate 92 is enabled. Gate 94 thus continues its output HI through to $t_3$ at which neither of gates 90 and 92 is enabled.

signal (f) comprises a pulse train of one-half the frequency of signal (e). Each pulse thereof, e.g., that occurring from $t_1$ to $t_3$, is coextensive with the pulse and space respectively related with signals 46 and 50. Each signal (f) space, e.g., that occurring from $t_3$ to $t_5$, is coextensive with the pulse and space respectively related with signals 48 and 52. Accordingly, signals (e) and (f), taken jointly, provide for ready processing of sensor output signals without the need for the tagging the sensor output signals with point-of-origin indication.

In the last-discussed practice of the invention, the digital pulse pattern defining those records including a particular object surface point of interest is reached by prior generation of signals 46–52 and at least signal (e). Signals 46–52 are each indicative of irradiated object surface portions as defined in the records. Signal (e) is indicative of those extents of signals 46–52 which have information content derived by irradiation through exclusive ones of the masks. Only if an object surface point is within an extent so defined, e.g., from $t_1$–$t_2$ in signal 46, will the ultimately generated digital pulse pattern include a pulse therefor. It will be noted that the resolution achieved is narrower than the extent of any one of the signals generated by any one of the masks.

In explaining the methods of the invention to this juncture, reference has been made to the use of the radiant energy of common frequency in time-spaced projection through masks, each having a different arrangement of clear and opaque segments. In this practice of the invention, the masks are sequentially transported through the energy projector for irradiating portions of the surface of an object in a discernible succession ultimately embodied in multiple record frames. As alluded to briefly above, the invention may be otherwise practiced whereby such discernible succession may be embodied in a single record frame. This single frame may be derived through simultaneous application of radiant energies of respectively unique frequency content, or other singular identifying characteristic, to corresponding different portions of the object surface. By way of example, if the clear and opaque segments of mask 28*c* of FIG. 2 were replaced by respectively unique radiant energy transmissive filters, e.g., were replaced by different color filters, projection of common frequency radiation onto the mask would result in different-frequency irradiation in each of the projection field segments and of each corresponding object surface portion. A single color frame of such exposure could then be examined by source-sensor pairs of correspondingly different frequency-based sensitivity to generate the identical pulse patterns for the selected surface points discussed above, namely, indicative of both the number of projection field segments in the frame and of those projection field segments in the frame which include the surface points. Accordingly, it will be appreciated that the term "succession" as employed herein particularly embraces a following in order of place, i.e., spatial succession.

Where multiple masks are used, namely, in the first-discussed practice of the invention, various alternate masking arrangements will be apparent to those skilled in the art. For example, plural masks may be moved relative to one another through relatively small increments, the masks including transmissive areas which are chain-coded. Masks 28*c*–28*f* of FIG. 2 may be substituted for by mask 28*c* moved successively vertically to also define the configurations for 28*d*–28*f*. The projector-mask combination may also be effected by projection cathode-ray tubes suitably excited to define the operative projection field. Similarly, although the particularly illustrated masks define plane-like transmissive parts, other transmissive part configurations may be employed. Reference has been made throughout to the object surface as comprising the containing boundary of an object. The invention further comtemplates the generation of signals for use in defining spatial relations as between object points not defining such boundary thereof where such points are discernible by irradiation of the object.

The foregoing and other variations may readily be introduced in practicing the invention without departing from the scope thereof. Accordingly, the particularly discussed practices and methods are intended in a descriptive and not in a limiting sense. The true spirit and scope of the invention is defined in the following claims.

What is claimed is:

1. A method for providing an output signal for use in defining the spatial position of a point on the surface of an object, comprising the steps of:

a. defining a projection field extending from a first location and including at least a part of said object surface including said point;

b. successively irradiating portions of said object surface part by successively projecting radiant energy from said first location into predetermined segments of said projection field, said segments collectively defining said projection field;

c. making a separate record of said object surface part for each such irradiation thereof; and d. generating a signal indicative both of the number of said records made and of those of said records which include said surface point, such generated signal constituting said output signal.

2. A method for providing an output signal for use in defining the spatial position of a point on the surface of an object, comprising the steps of:

a. defining a projection field extending from a first location and including said object surface;

b. successively irradiating portions of said object surface by separately projecting radiant energy from said first location into predetermined segments collectively defining said projection field;

c. making records of such irradiated object portions in a succession corresponding to such irradiating succession; and d. generating a signal selectively indicative of the order in such record succession of those records which include said surface point, such generated signal constituting said output signal.

3. The method claimed in claim 2 wherein said record succession includes $n$ records and wherein said step (d) is practiced by generating a signal having a time extent including $n$ equal time intervals each corresponding to one of said records, said signal defining a first voltage amplitude in those of said $n$ intervals corresponding to records including said surface point and defining second voltage amplitude in the remaining ones of said intervals.

4. A method for providing first and second output signals for use in defining the spatial positions of first and second points on the surface of an object, comprising the steps of:

a. defining a projection field extending from a first location and including said first and second surface points;

b. successively irradiating portions of said object surface by separately projecting radiant energy from said first location into predetermined segments of said projection field, at least one of said projection field segments being exclusive of one of said first and second surface points;

c. making records of such irradiated object portions in a succession corresponding to such irradiating succession;

d. providing said first output signal by generating a signal selectively indicative of the order in such record succession of those records which include said first surface point; and e. providing said second output signal by generating a signal selectively indicative of the order in such record succession of those records which include said second surface point.

5. The method claimed in claim 4 wherein said record succession includes $n$ records and wherein said step (d) is practiced by generating a signal having a time extent including $n$ equal time intervals each corresponding to one of said records, said signal defining a first voltage amplitude in those of said $n$ intervals corresponding to records including said first surface point and defining second voltage amplitude in the remaining ones of said intervals.

6. The method claimed in claim 4 wherein said record succession includes $n$ records and wherein said step (e) is practiced by generating a signal having a time extent including $n$ equal time intervals each corresponding to one of said records, said signal defining a first voltage amplitude in those of said $n$ intervals corresponding to records including said second surface point and defining second voltage amplitude in the remaining ones of said intervals.

7. A method for providing an output signal defining the spatial position of a point on the surface of an object, comprising the steps of:

a. defining a projection field extending from a first location and including said object surface;

b. successively irradiating portions of said object surface by separately projecting radiant energy from said first location into predetermined segments collectively defining said projection field;

c. making records of such irradiated object portions in a succession corresponding to such irradiating succession; and d. generating a first signal selectively indicative of the order in such record succession of those records which include said first surface point and a second signal indicative of positional coordinates of said surface point in said records inclusive thereof, said first and second signals constituting said output signal.

8. The method claimed in claim 7 wherein said record succession includes $n$ records and wherein said step (d) is practiced in respect of said first signal by generating a signal having a time extent including $n$ equal time intervals each corresponding to one of said records, said signal defining a first voltage amplitude in those of said $n$ intervals corresponding to records including said surface point and defining second voltage amplitude in the remaining ones of said intervals.

9. A method for providing first and second output signals defining the spatial positions of first and second points on the surface of an object, comprising the steps of:

a. defining a projection field extending from a first location and including said first and second surface points;

b. successively irradiating portions of said object surface by separately projecting radiant energy from said first location into predetermined segments of said projection field, at least one of said projection field segments being exclusive of one of said first and second surface points;

c. making records of such irradiated object portions in a succession corresponding to such irradiating succession;

d. providing said first output signal by generating a first signal selectively indicative of the order in such record succession of those records which include said first surface point and a second signal indicative of positional coordinates of said first surface point in said records inclusive thereof; and e. providing said second output signal by generating a third signal selectively indicative of the order in such record succession of those records which include said second surface point and a fourth signal indicative of positional coordinates of said second surface point in said records inclusive thereof.

10. The method claimed in claim 9 wherein said record succession includes $n$ records and wherein said step (d) is practiced in respect of said first signal by generating a signal having a time extent including $n$ equal time intervals each corresponding to one of said records, said signal defining a first voltage amplitude in those of said $n$ intervals corresponding to records including said first surface point and defining second voltage amplitude in the remaining ones of said intervals.

11. The method claimed in claim 9 wherein said record succession includes $n$ records and wherein said step (e) is practiced in respect of said third signal by generating a signal having a time extent including $n$ equal time intervals each corresponding to one of said records, said signal defining a first voltage amplitude in those of said $n$ intervals corresponding to records including said second surface point and defining second voltage amplitude in the remaining ones of said intervals.

12. The method claimed in claim 1 wherein said step (b) is practiced by disposing an energizable source of said radiant energy in energy projecting relation to said object surface, successively placing masks of different radiant energy transmissive character between said source and said object surface and energizing said source after each such mask placement.

13. The method claimed in claim 12 wherein said output signal is generated from generation of first signals each indicative of irradiated object surface portions as defined in said records and a second signal for each said first signal and indicative of that extent of the irradiated object surface portion indicated in said first signal which was irradiated through an exclusive one of said masks.

14. A method for providing an output signal for use in defining the spatial position of a point on the surface of an object, comprising the steps of:

a. defining a projection field extending from a first location and including at least a part of said object surface including said point;

b. irradiating portions of said object surface part by projecting radiant energy from said first location into predetermined segments of said projection field, said segments collectively defining said projection field;

c. making a record of said object surface part upon such irradiation thereof; and d. generating a signal indicative both of the number of said projection field segments in said record and of those of said projection field segments in said record which include said surface point, such generated signal constituting said output signal.

15. The method claimed in claim 14 wherein said step (b) is practiced by disposing an energizable source of said radiant energy in energy projecting relation to said object surface, placing a mask comprised of adjoining portions of respectively unique radiant energy transmissive character between said source and said object surface, said projection field segments corresponding to said mask portions, and energizing said source after such mask placement.

* * * * *